United States Patent [19]

Schwartz

[11] 4,058,016
[45] Nov. 15, 1977

[54] COMBINATION VACUUM/PRESSURE GAUGE AND DUAL PURPOSE CASING CONSTRUCTION

[75] Inventor: Edwin L. Schwartz, Los Angeles, Calif.

[73] Assignee: Rite Autotronics Corporation, Los Angeles, Calif.

[21] Appl. No.: 672,675

[22] Filed: Apr. 1, 1976

[51] Int. Cl.² ............................................. G01L 7/16
[52] U.S. Cl. ..................................... 73/419; 73/420; 73/431
[58] Field of Search ...................... 73/431, 407 R, 419, 73/420; 116/114 PV

[56] References Cited

U.S. PATENT DOCUMENTS

| | | | |
|---|---|---|---|
| 1,430,174 | 9/1922 | Marchus | 73/419 |
| 2,427,249 | 9/1947 | Birch | 73/407 R |
| 3,034,357 | 5/1962 | Brown | 73/407 R |
| 3,198,014 | 8/1965 | Corry | 73/407 R |
| 3,296,868 | 1/1967 | Koppel et al. | 73/407 R |
| 3,429,291 | 2/1969 | Hoffman | 73/419 |

Primary Examiner—James J. Gill
Assistant Examiner—Anthony V. Ciarlante
Attorney, Agent, or Firm—Robert E. Geaugue

[57] ABSTRACT

A casing construction is provided which can be utilized for the assembly of components of either a combination vacuum/pressure gauge or of a high pressure gauge while utilizing the same dial indicator movement; the combination vacuum/pressure gauge having a vacuum connection at one end of the casing and a pressure connection at the other end and the same complete scale can be utilized for the measurement of either value.

15 Claims, 11 Drawing Figures

COMBINATION VACUUM/PRESSURE GAUGE AND DUAL PURPOSE CASING CONSTRUCTION

BACKGROUND OF THE INVENTION

Instruments are utilized in testing the performance of combustion engines for automobiles and these instruments include gauges for measuring inlet manifold vacuum, fuel pump pressure and cylinder compression. Generally, separate instrument are utilized for each such measurement. However, in the case of inlet manifold vacuum or fuel pump pressure, a bourdon type gauge has been utilized where the vacuum and pressure are connected to opposite ends of the bourdon tube and the zero indicator arm is at the center of the scale. When pressure is connected with the gauge, the indicator arm reads on one half of the scale and when vacuum is attached to the gauge, the indicator arm reads on the other half of the scale. Thus, only one half of the scale is available for obtaining either measurement.

Separate pressure gauges have also been used for the measurement of fuel pump pressure and the measurement of cylinder compression pressure because of the large difference in magnitude of these pressures. While the gauges for measuring pressures usually consist of a piston working against a spring, a larger spring has to be used for the measurement of compression pressure and therefore, instrument casings of different sizes and design have been required for each of these types of pressure gauges.

SUMMARY OF THE INVENTION

The present invention provides a combination vacuum/pressure gauge in which the scale for both pressure or vacuum covers the entire working portion of the dial. Also, the invention provides an instrument casing from which can be constructed either a combination vacuum/pressure gauge or a high pressure gauge. For the combination vacuum/pressure gauge, pistons are attached to opposite ends of a movable shaft and vacuum can be admitted at one end of the shaft and pressure admitted to the other end of the shaft. The pistons at opposite ends of the shaft utilize rolling diaphragms for ease and simplicity of construction. A single spring is utilized against which both the vacuum and pressure pistons operate and thus the values of pressure and vacuum must be such as to result in the same range of movement of the shaft. For instance, a vacuum up to thirty inches of mercury in a fuel intake manifold can be measured with the same device that measures fuel pump pressure to 15 psi. Separate tubes are connected to the casing for vacuum and pressure and a switch is provided in the casing for connecting the passage in use with the proper end of the shaft. In the pressure-vacuum device the shaft moves the pointer in the same direction whether pressure or vacuum is being measured and thus the present device has the advantage that the complete scale can be used for either pressure or vacuum measurement.

Since the measurement of cylinder compression pressure up to 240 psi cannot be measured with the combustion vacuum/pressure gauge, the instrument casing is constructed so that it can be used either for a vacuum/pressure gauge with a relative light spring or for a compression pressure gauge with a heavier spring. The base of the instrument casing contains provision for opposed cylinders of the combination gauge with the shaft moving between the cylinder portions. In addition, the casing provides another compression pressure cylinder for a piston having a piston rod which moves transverse to the piston rod for the combination gauge. Thus, the same casing can be assembled with either the combination gauge or the high-pressure gauge, but not with both.

The same dial indicator can be used for either assembly. The pinion for the dial indicator is mounted to project from the apex of a ninety degree mounting block so that the same pinion can be used in connection with a rack gear moving with either shaft when the block is properly positioned on the dial plate. Thus, a single output pinion can be utilized to drive a single dial indicator but different scales must be placed on the dial plate depending on which instrument is assembled in the casing. The switch utilized with the vacuum/pressure component of the instrument makes it easy to switch from a measurement of pressure to a measurement of vacuum and, of course, this switch is not necessary when the stronger spring and piston combination is in use which measures the compression pressure of the piston.

BRIEF DESCRIPTION OF THE SHOWN EMBODIMENT

Figure 1:
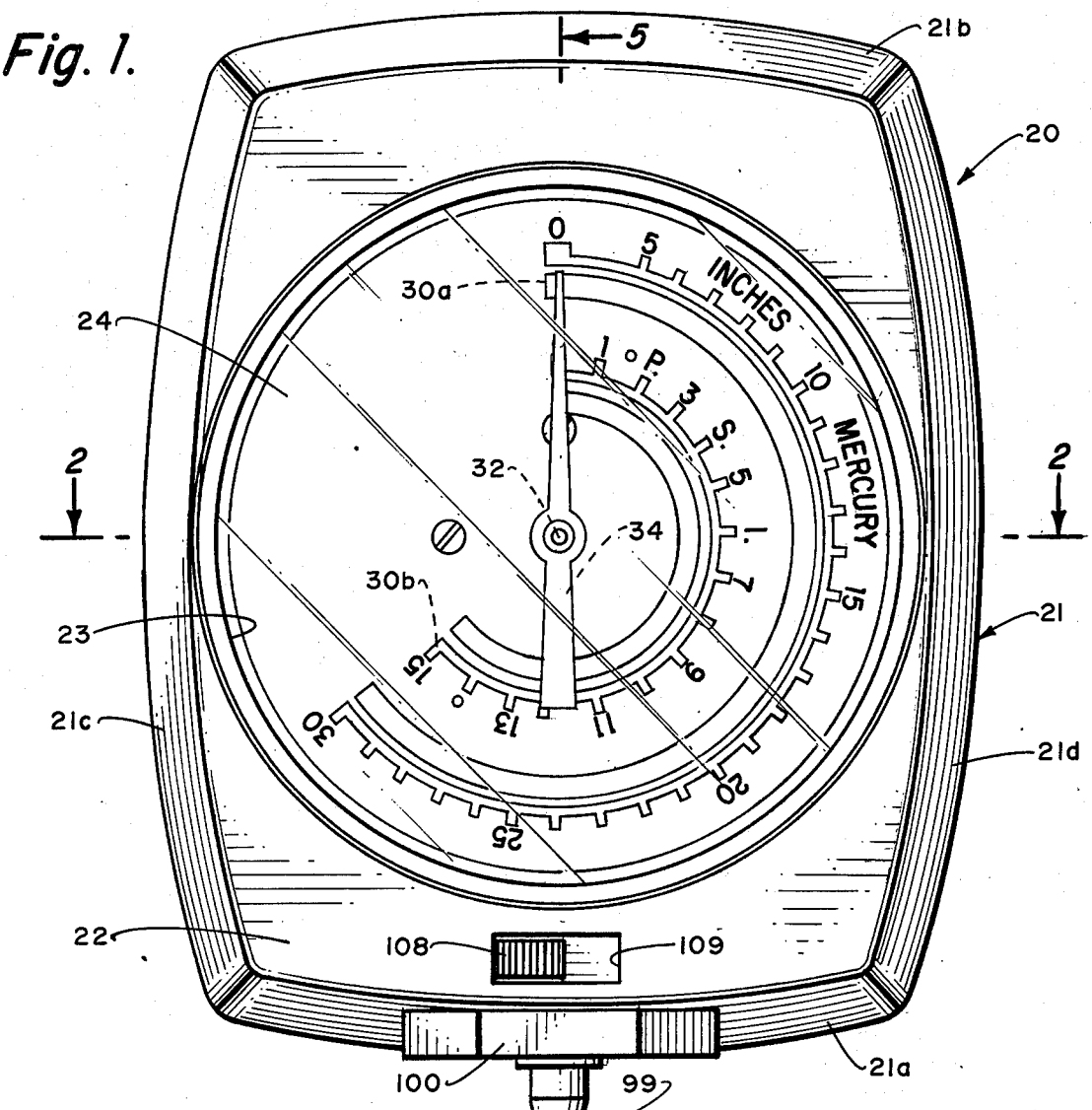
FIG. 1 is a top plan view of the instrument casing illustrating the scale of the dial plate for the combustion vacuum/pressure gauge.
Figure 11:
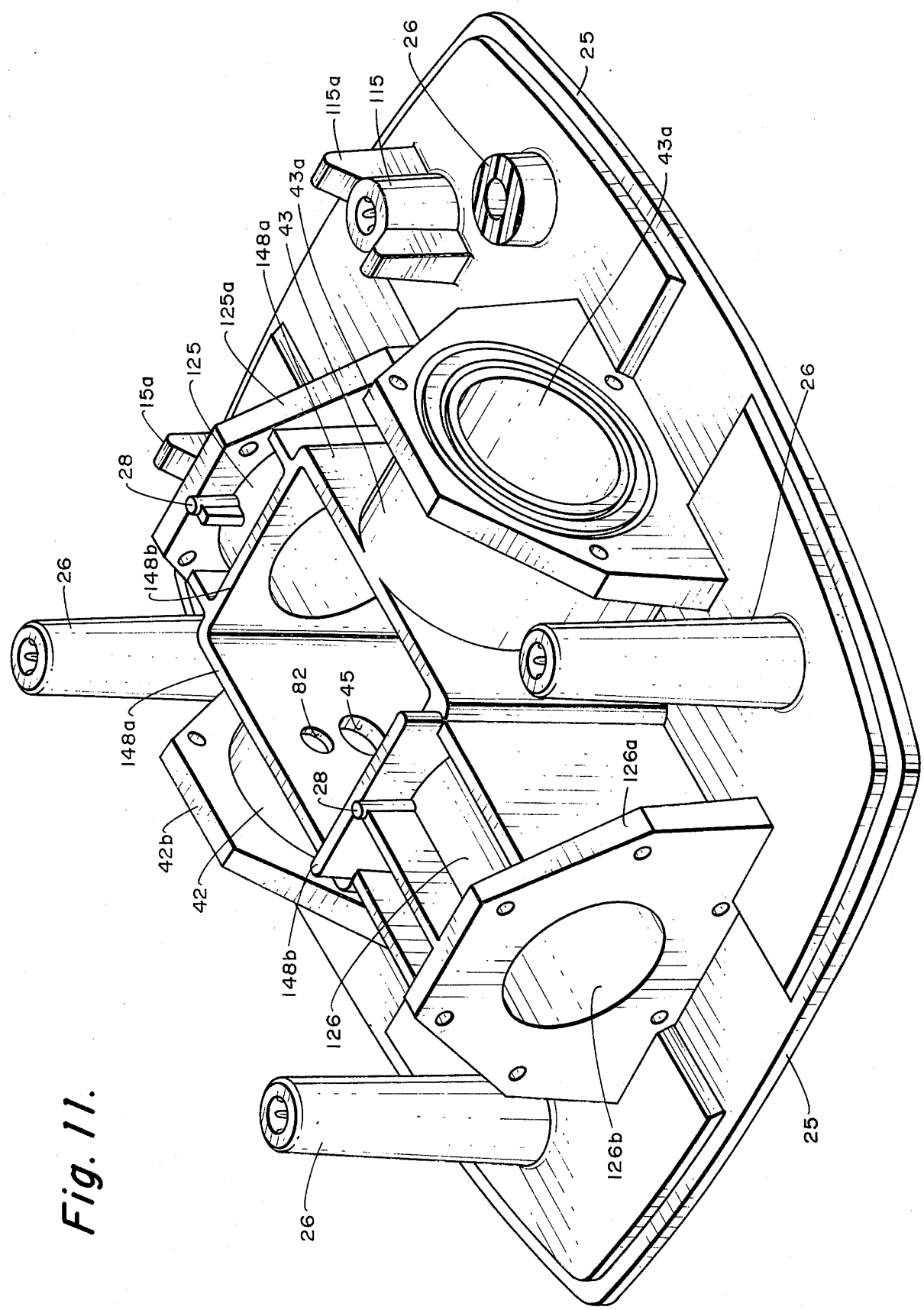
FIG. 11 is a perspective view of the bottom of the instrument casing showing the relationship of the cylinder portions for the two different instruments which can be assembled in the casing.

Referring to FIG. 1, the casing of the instrument 20 consists of a continuous side 21 extending completely around the instrument and having end sections 21a and 21b and side sections 21c and 21d. A top plate 22 is connected to the side section of the instrument casing and contains a circular opening 23 in which is located a plexiglass cover 24 for the instrument. The casing has a base 25 which extends to the side sections in order to close the casing. A plurality of hollow projections 26 extend upwardly from the base 25 (see FIG. 11) and receives pins 27 projecting from top 22 in order to connect the components of the gauge together. As illustrated in FIG. 11, two pins 28 extend upwardly from the base and enter into openings in a dial plate 30 so that the dial plate is rigidly secured to the casing. The dial plate 30 carries scales 30a and 30b for the measurement of both inches of mercury and pressure. As discussed later, a different scale would be used on the dial plate for the gauge component which measures high pressure.

Figure 6:
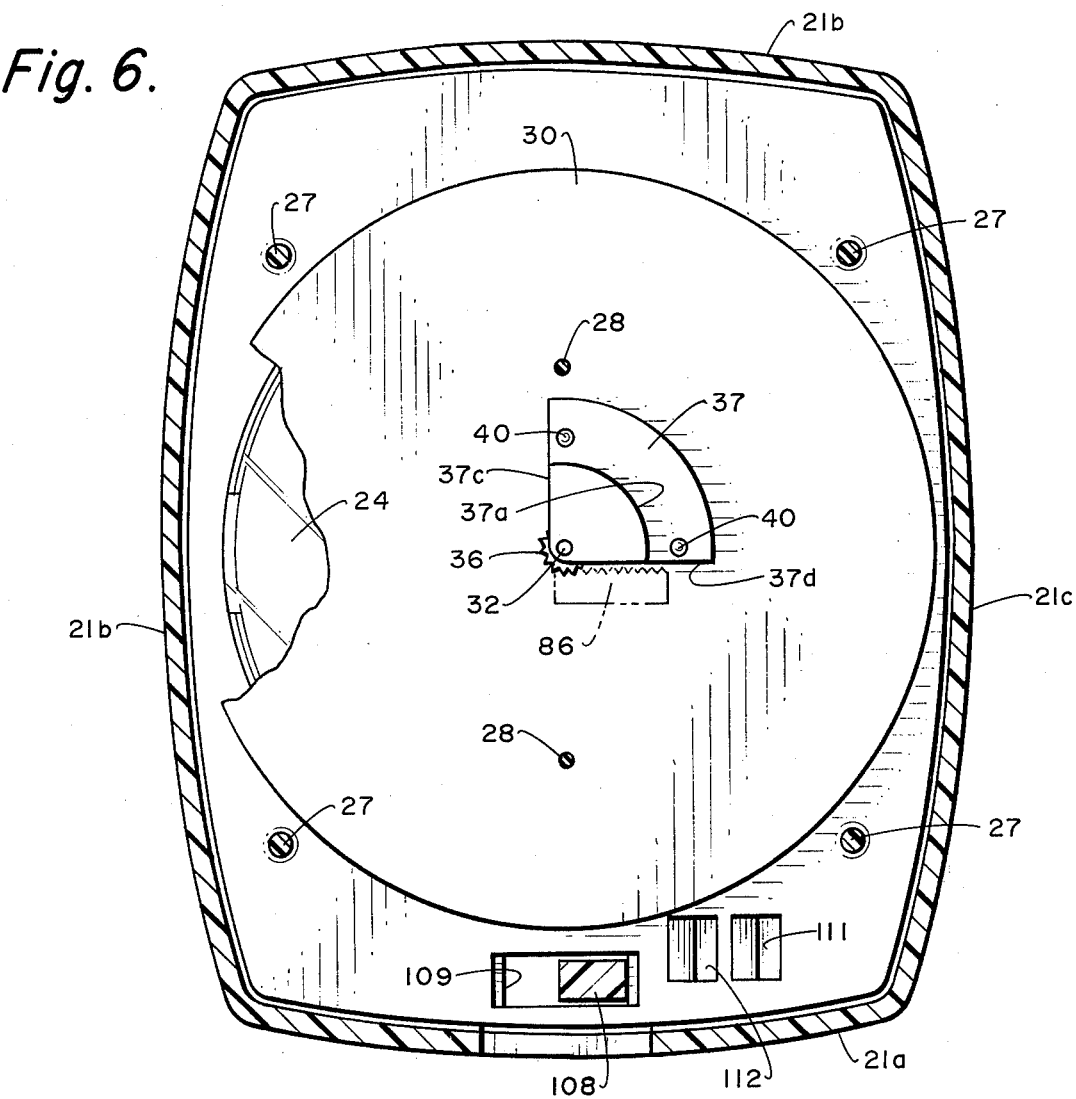
FIG. 6 is a horizontal section along line 6—6 of FIG. 5 illustrating the mounting block for the pinion gear.

A pin 32 passes through an opening in the end of an indicator arm end 34 and through a center opening in the dial plate 30. The head 32a of the pin holds the indicator arm 34 against the dial plate 30 and the other end of the indicator pin 32b carries a pinion gear 36. A pinion block 37 has right angle edge surfaces 37c and 37d and a cutout 37a for pinion gear 36 is located at the apex of these surfaces (see FIG. 6). Also, the block contains arm opening 37b for receiving end 32b of the pin 32. The pinion block 37 is secured to dial plate 30 by two screws 40 which position the block to receive the pin end 32b. Since the gear 36 is at the apex of the pinion block, a rack gear can move along side 37d as in FIG. 6 for the combination vacuum/pressure gauge or can move along side 37c for the high pressure gauge.

Figure 2:
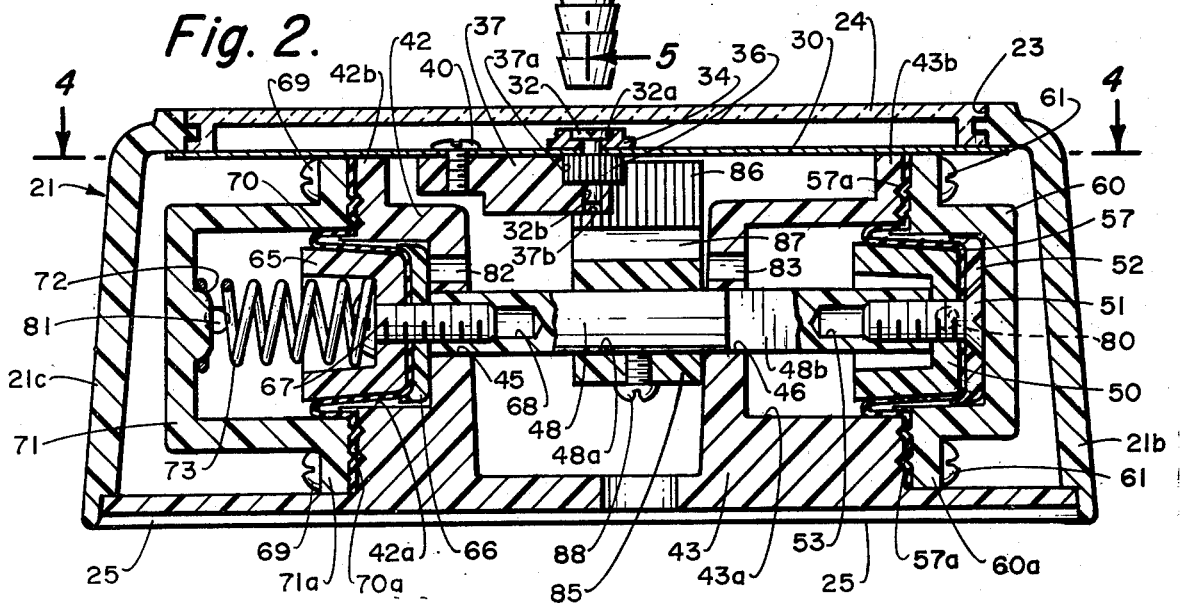
FIG. 2 is a vertical section along line 2—2 of FIG. 1 illustrating the vacuum and pressure pistons for the combination gauge located at opposite ends of a single shaft which moves the dial indicator arm.
Figure 3:
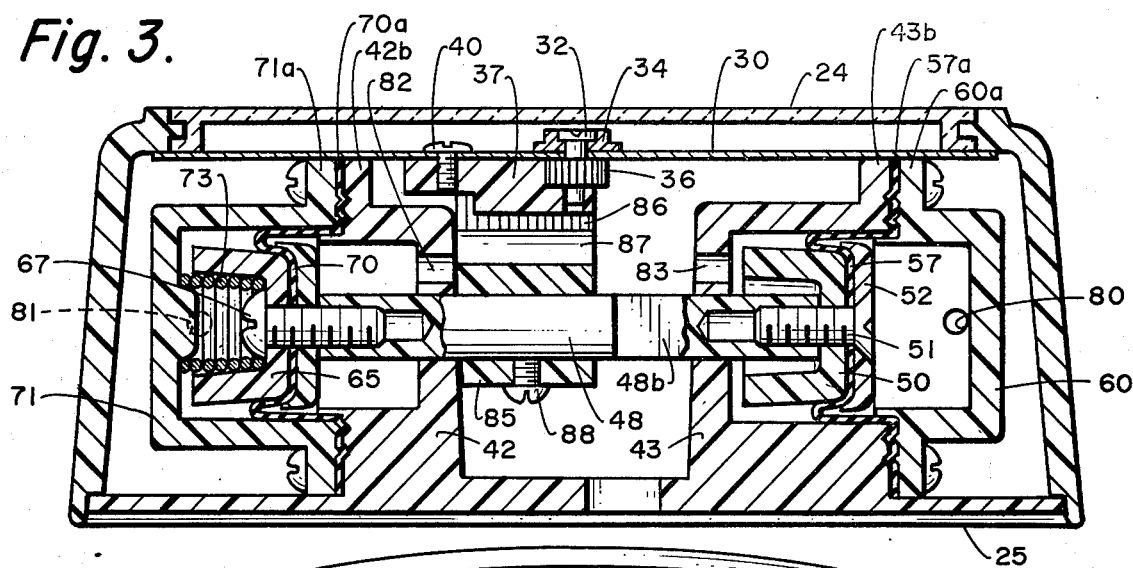
FIG. 3 is a section similar to FIG. 2 showing the position of the piston rod at the other end of its travel.
Figure 4:
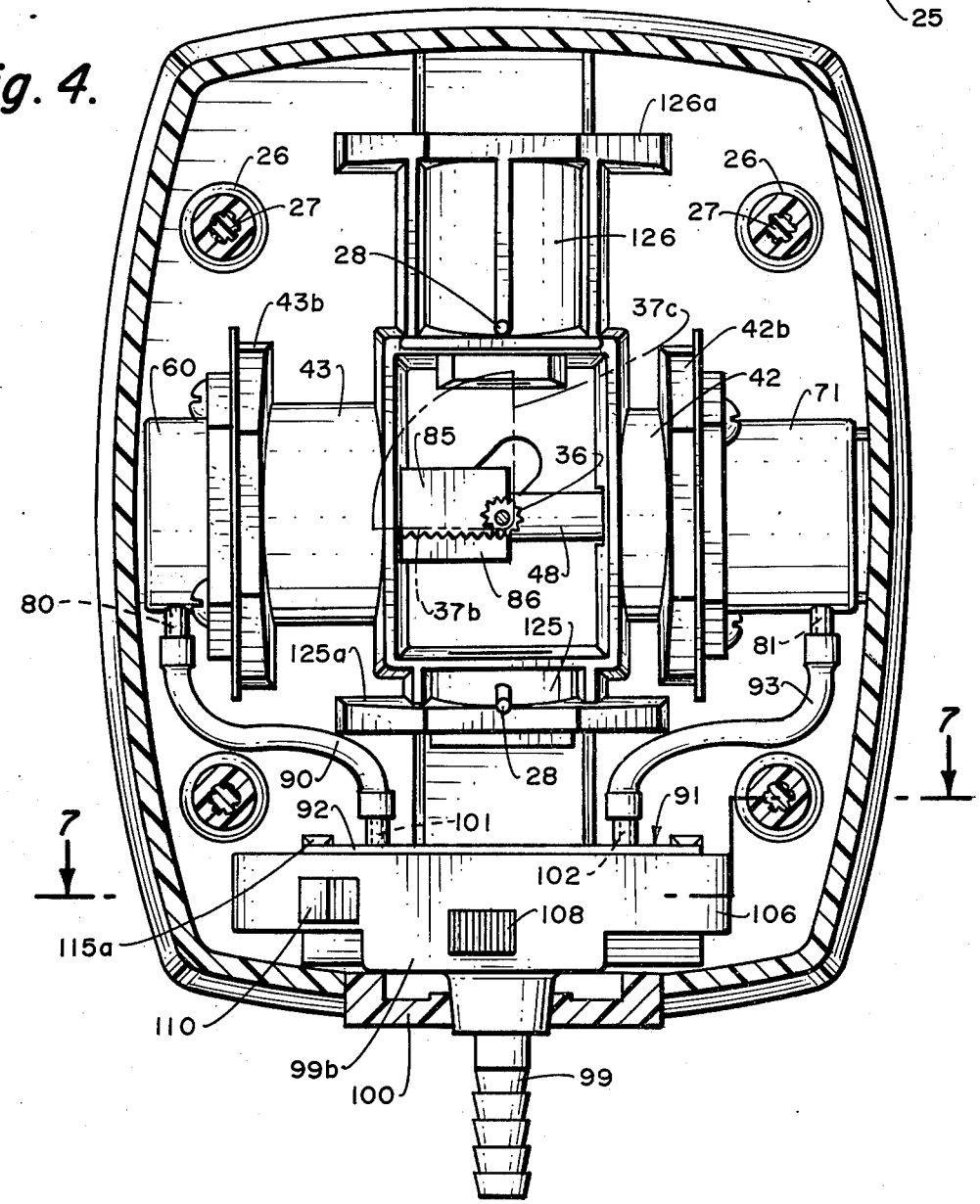
FIG. 4 is a horizontal section along line 4—4 of FIG. 2 illustrating the switch for connecting opposite pistons with vacuum or pressure.

Referring to FIGS. 2, 4 and 11, a pair of projection walls 42 and 43 extend upwardly from the base 25 of the casing and form cylindrical openings 42a and 43a, respectively, and the cylindrical projections have flanges 42b and 43b, respectively. Projection 42 contains a round opening 45 which receives round portion 48a of piston rod or shaft 48 and projection 43 contains a square opening 46 which receives square portion 48b of shaft (rod) 48. The axes of cylindrical opening 42a and 43a have a common axial line extending longitudinally therebetween. A circular piston 50 is attached to portion 48b of shaft 48 by a screw 51 attached to piston head 52 and screw 51 passes through an opening in rolling diaphragm 57 located between piston 50 and head 52. A cylinder head 60 closes the end of opening 43a and has an edge flange 60a attached to flange 43b by screws 61. Circular edge 57a of diaphragm 57 is located between flanges 43b and 60a and the diaphragm is long enough to roll between piston 50 and opening 43a as the piston moves (see FIGS. 2 and 3).

A circular piston 65 is attached to portion 48a of shaft 48 by a screw 67 also attached to piston head 66 and screw 67 passes through an opening in rolling diaphragm 70 located between piston 65 and head 66. A cylinder head 71 closes the opening 42a and has an edge flange 71a attached to flange 42b by screws 69. Circular edge 70a of diaphragm 70 is located between flanges 42b and 71a. The cylinder head 71 has an enlargement 72 which locates one end of a spring 73 and the other end bears against piston 65 around the head end of screw 67. In the cylinder head 60, there is an opening 80 for the introduction of pressure against the surface of the piston head 52 and in cylinder head 71, there is an opening 81 for the communication of vacuum on the surface of piston 65. The rolling diaphragms 57 and 70 seal between the pistons and piston heads and permit the pistons to move within the cylinder heads. The wall of projections 42 and 43 have opening 82 and 83, respectively, for venting one side of the pistons to atmospheric pressure so that the pistons will be sensitive only to the pressure or vacuum on the other side.

A rack gear 86 is located on an upstanding wall 87 extending from a square box structure 85 having a square opening 89. Portion 48a of shaft 48 extends through opening 89 and the rack gear is held in position to mesh with pinion 36 by means of set screw 88 in box 85. The rack gear 86 moves past side 37d of the pinion block 37 and rotates the pinion gear 36 as it moves by. The amount of movement of the rack gear 86 will, of course, depend upon the pressure above the piston head 50 introduced through opening 80 or the vacuum below the piston 65 introduced by opening 81. The movement of the pinion gear can move the indicator arm 34 over the complete scales of the dial plate 30. As illustrated in FIG. 2, the pistons 50 and 65 are in their right hand position where they are biased by the spring 73 since no pressure is acting on either of the pistons. However, in FIG. 3, the pistons are shown in their left hand position which compresses the spring 73 and moves the rack gear 86 past the pinion gear 36 in order to place the maximum reading on the dial plate 30.

Figure 5:
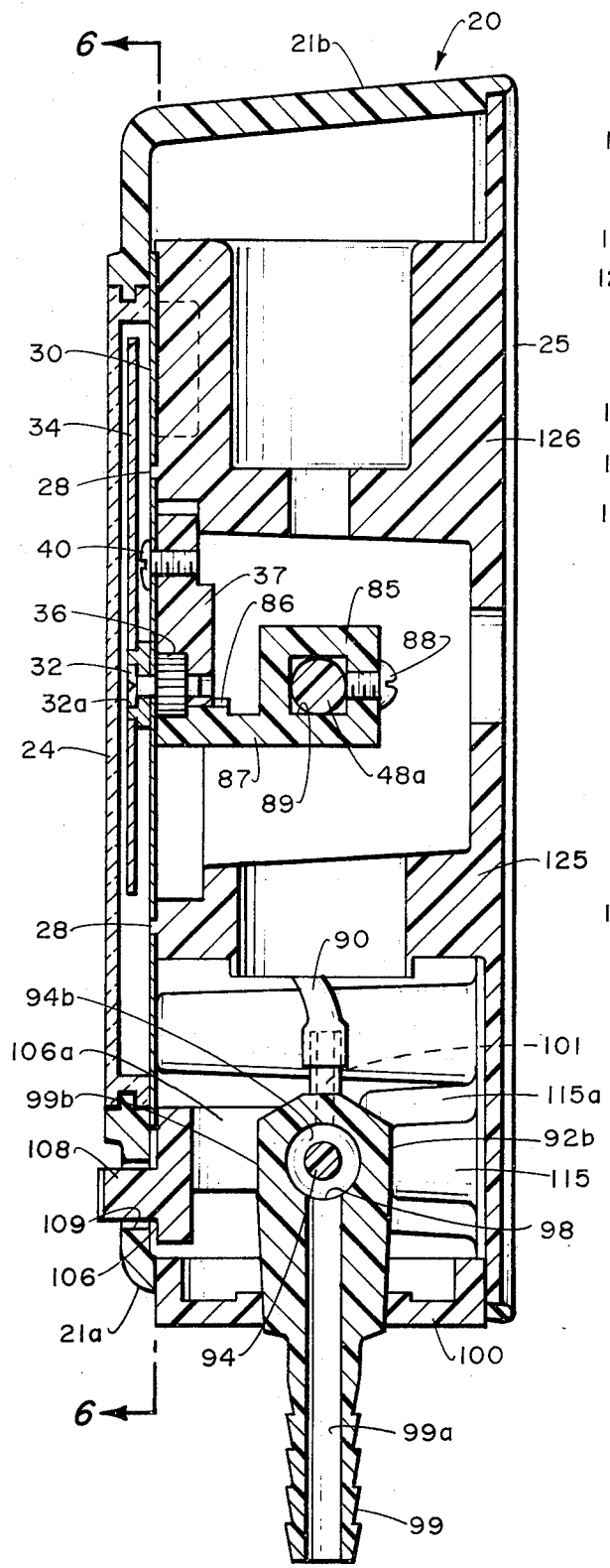
FIG. 5 is a transverse vertical section along line 5—5 of FIG. 1 illustrating the rack gear mounted on the piston rod and in mesh with the pinion for the vacuum/pressure combination gauge.
Figure 7:
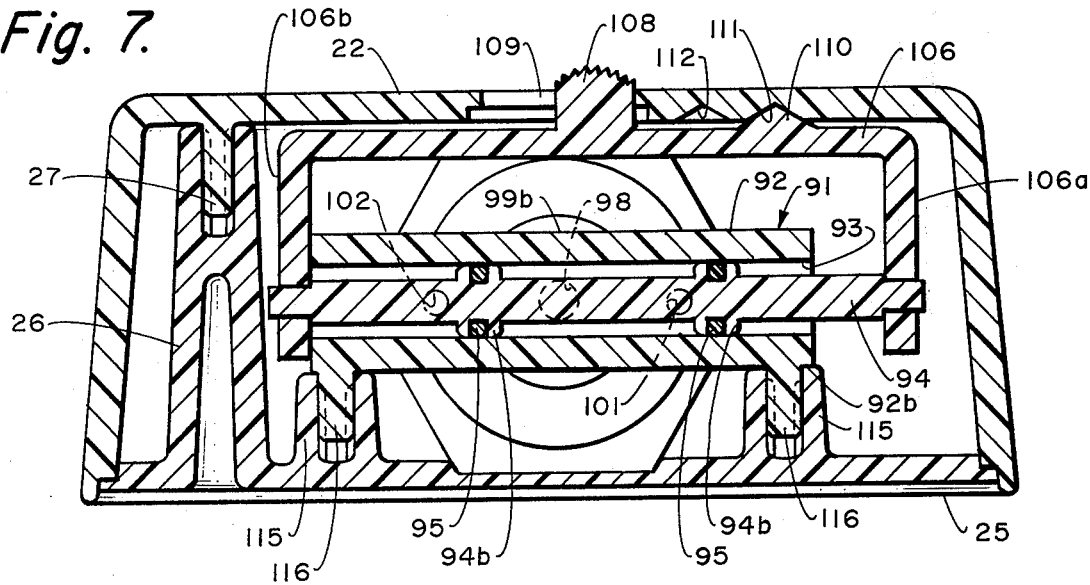
FIG. 7 is a vertical section along line 7—7 of FIG. 4 illustrating the spindle for the valve.
Figure 8:
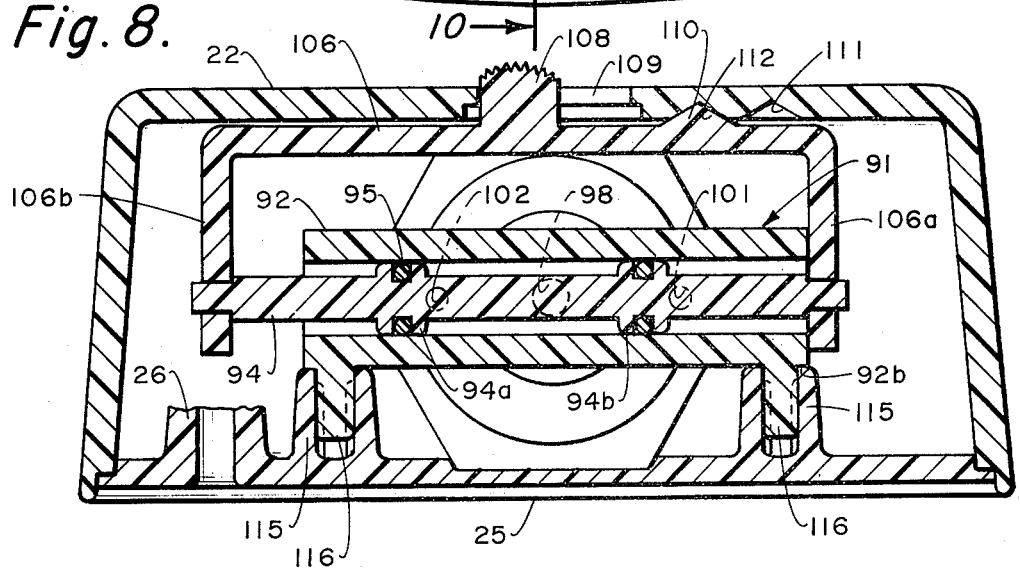
FIG. 8 is a view similar to FIG. 7 illustrating the valve in a second position.

Referring to FIG. 4, a pressure, such as fuel pump pressure, is introduced to opening 80 through a passage 90 connected to valve housing 91 and a vacuum can be introduced to opening 81 by a line 93 also connected to the valve housing 91. The valve housing 91 (see FIGS. 7 and 8) consists of a tubular member 92 having an internal opening 93 into which projects shaft 94 which is smaller than opening 93 and carries control lands 94a and 94b, each containing an O-ring 95 for sealing against tube 92. An inlet opening 98 passes through tube 92 at a location between the lands (see FIG. 5). An inlet fitting 99 is contained in a panel 100 which is secured in sides 21a of the casing and the fitting contains passage 99a which connects with inlet opening 98 through enlarged portion 99b. Outlet opening 101 in tube 92 connects with passage 90 and outlet opening 102 connects with passage 93. With the valve lands in the position of FIG. 7, pressure (such as fuel pump pressure) enters through opening 98 and leaves the valve through opening 101 and passage 90 leading to opening 80. With the valve lands in the position of FIG. 8, vacuum (such as inlet manifold vacuum) enter inlet opening 98 and is communicated through opening 102 and passage 93 to opening 81. A U-shaped lever 106 has arms 106a and 106b connected to opposite ends of shaft 94 and has a top button 108 movable in a slot 109 in the top 22 of the casing. Also, the top of arm 106 carries a triangular shaped projection 110 which can enter notch 111 when valve shaft is to the right and can enter notch 112 when the valve shaft is to the left. As illustrated in FIGS. 7 and 8, the valve tube 92 has two projections 116 which enter hollow projection 115 from base 25 of the casing and, as illustrated in FIG. 5, the projections 115 have angular surfaced extensions 115a at each side to receive and support portion 92b which is hexagonal in shape. The shaft 94 does not have to be enlarged beyond the lands since only one opening 101 or 102 is connected to a source at fitting 99 which connects with opening 98.

It is therefore apparent that the present invention provides a first component for the instrument casing which is a combination vacuum/pressure gauge in which either a pressure or a vacuum can be applied to opposite ends of the gauge shaft and the indicator arm can be moved over the complete dial scale regardless of whether the gauge is indicating inches of mercury or pounds per square inch of pressure. Thus, the complete dial is available for measurement of value and in order to switch from one type of measurement to another, it is only necessary to switch the value lever 106 to connect the fitting 99 to the proper desired vacuum or pressure source. The rolling diaphragms provide excellent seals for sealing the opposite sides of the pistons while providing minimum friction against movement of the pistons. It is pointed out that the portions of the cylinders for both the pressure and the vacuum piston are formed integral with the base 25 of the casing and it is only necessary to apply the rolling diaphragm and the cylinder heads to these projections in order to complete the cylinder construction.

Figure 10:
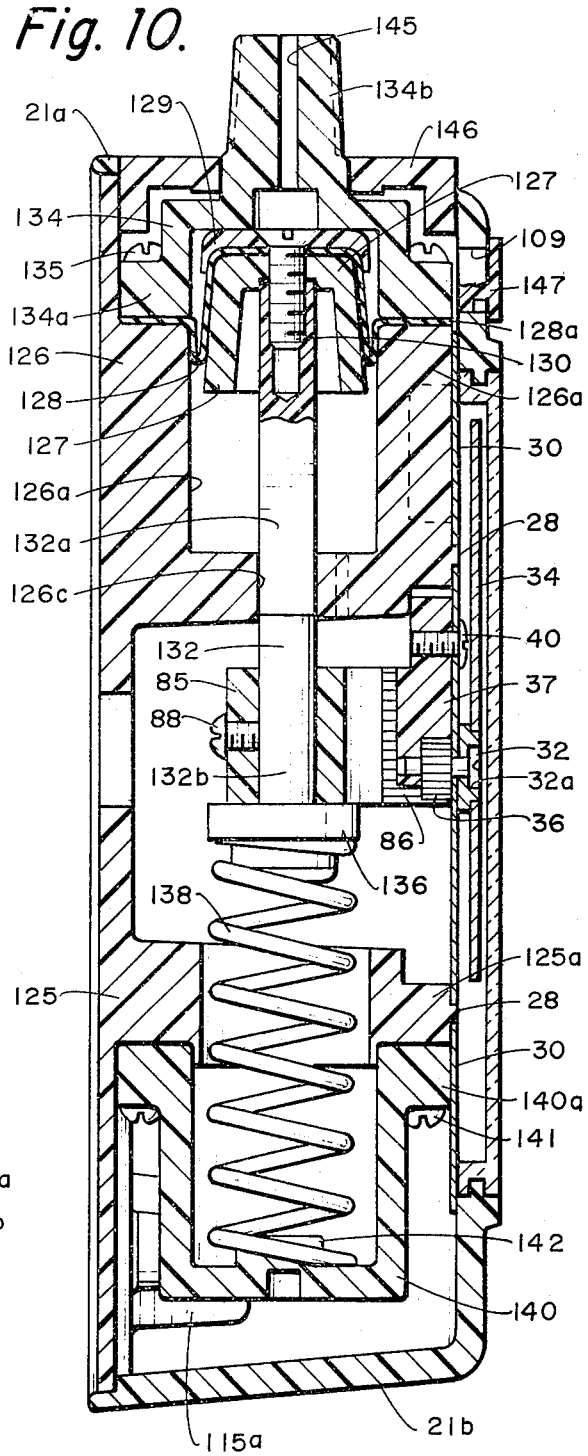
FIG. 10 is a transverse vertical section along line 10—10 of FIG. 9 illustrating the piston and spring for the high pressure gauge.
Figure 9:
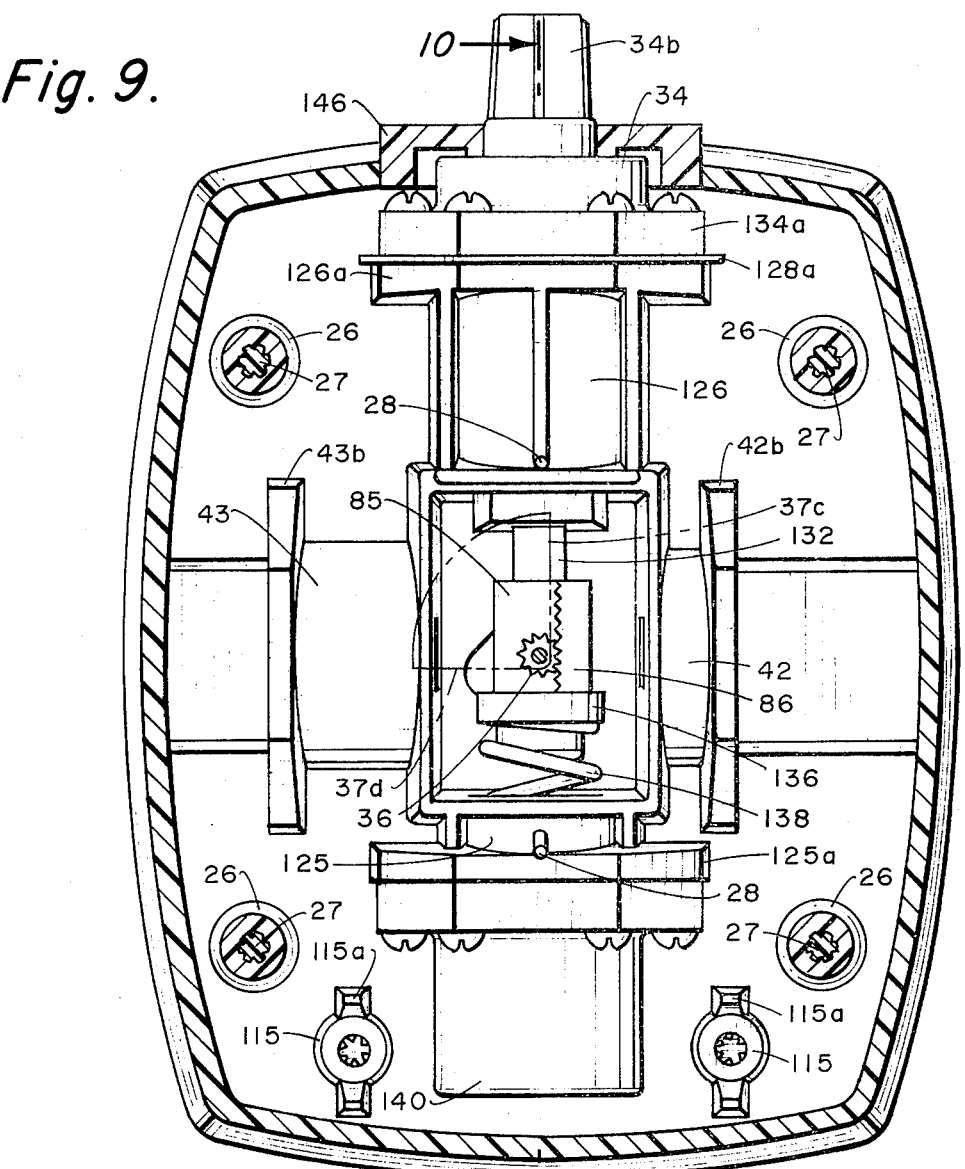
FIG. 9 is a sectional view similar to FIG. 4 showing the high pressure gauge assembled in the casing.

As previously pointed out, the casing 20 can also be utilized to house a high-pressure gauge in place of the vacuum/pressure gauge just described. This second gauge must be more sturdy to withstand pressures up to 240 psi which correspond to compression pressures in the cylinders of internal combustion. The high-pressure gauge is illustrated in FIGS. 9 and 10 and utilizes a first cylindrical projection 125 from the base 25 having a flange 125a and a second cylindrical projection 126 having a flange 126a. The circular projection 126 has a cylindrical opening 126b (see FIG. 10) and the wall around the opening is relatively thick to withstand high pressures. The axes of the cylindrical projections 125 and 126 have a common longitudinally extending axial line which is perpendicular to the common axial line of cylindrical projections 42 and 43.

Piston 127 located in opening 126b has a piston head 129 connected thereto by screw 130 and rolling diaphragm 128 is located between piston 127 and head 129. The edge 128a of diaphragm 128 is secured between flange 126a and flange 134a on a cylinder head 134 and the flanges are attached together by screws 135. Portion 132a of shaft 132 is square and moves in a square opening 126c in projection 126 so that the piston 127 and shaft 132 cannot rotate during movement. Portion 132b of the shaft 132 is round and receives the square box 85 which supports the pinion gear 86. The end of shaft portion 132b carries an enlargement 136 which seats one end of a strong spring 138. The rack gear 86 and shaft 132 move transversely with respect to their direction of movement in the previous embodiment so that gear 86 moves along the side 37c of the pinion block illustrated in FIG. 6. Flange 140a of cylindrical member 140 is secured to flange 125a by screws 141 and the cylinder member contains a projection 142 which centers the other end of spring 138 and serves as a base for the spring.

Referring to FIGS. 10 and 11, it is obvious that when the cylinder member 140 is attached to flange 125a, the valve 91 for the combustion vacuum/pressure gauge is not assembled on projections 115. The valve 91 serves no purpose for the high-pressure gauge since the pressure is introduced to the piston through projection 134b on the cylinder head 134 which contains passage 145. The projection 134b is mounted by a panel 146 located inside section 21b of the casing.

From the above description, it is apparent that when the compression pressure of a cylinder is introduced into passage 145, it will drive the piston 127 against the force of spring 138 and the rack gear 86 will move the pinion 36 and the indicator arm 34 over the dial plate 30. Also, it is apparent that a pressure scale on the dial plate 30 will have a different pressure range in this embodiment than the pressure scale in the first embodiment since the high-pressure gauge will measure up to about 240 psi, whereas the combination gauge measures pressures up to 15 psi.

By the use of the angularly shaped pinion block 37, it is possible to utilize the same casing, rack gear, pinion gear, indicator arm and dial plate for either of two different gauges, even though the shafts for the different gauges move in transverse directions. Substantially, the full dial plate is available for pressure measurement with the high-pressure gauge as well as for either vacuum or pressurement measurement with the combination gauge. By locating the box 85 for the rack gear on the round part of the rods, it is possible to rotate the rack gear and adjust it to mesh properly with the pinion gear. In FIG. 10, a plug 147 is located in the casing at the location where the switch button 108 projected through the casing. Since the spring 138 for measuring compression pressure is strong, a box construction 148 (see FIG. 11) having sides 148a and 148b is utilized to tie together the cylinders 125 and 126 and prevent them from spreading apart when a high-pressure is applied to piston 127.

What is claimed is:

1. An instrument casing construction for a combination vacuum/pressure gauge or alternatively a high-pressure gauge comprising:
   a casing base connected at its edges to a casing side;
   first and second opposed cylindrical projections extending upwardly from said base and having a first common longitudinally extending axial line;
   third and fourth opposed cylindrical projections extending upwardly from said base and having a second common longitudinally extending axial line perpendicular to said first axial line;
   each of said projections have a mounting flange extending outwardly therefrom.

2. An instrument casing as defined in claim 1:
   a top casing panel attached to said casing side;
   a plurality of hollow projections extending upwardly from said base; and
   a plurality of pins extending downward from said top panel into said hollow projections to assemble said case.

3. An instrument casing as defined in claim 1:
   said first projection having a first wall containing a first piston rod opening and said second projection having a second wall containing a second piston rod opening.

4. An instrument casing as defined in claim 3:
   first and second cylinder heads attached to said flanges of said first and second cylindrical projections to form first and second cylinder spaces within said first and second projections, respectively;
   first and second pistons in said first and second spaces;
   a piston rod connected between said pistons; and
   a spring located between said second cylinder head and said second piston to bias said second piston toward said second wall and said first piston toward said first cylinder head;
   said piston rod extending through said first and second piston rod openings in said first and second walls, respectively.

5. An instrument casing as defined in claim 4:
   a pressure opening in said first cylinder head and a vacuum opening in said second cylinder head, said openings being located to move said piston rod over substantially its full stroke in response to either pressure or vacuum.

6. An instrument casing as defined in claim 5:
   valve means supported on said casing and connected with a passage exterior of said casing, said valve means being movable to a first position to connect a pressure source in said exterior passage with said pressure opening or to a second position to connect a vacuum source in said exterior passage with said vacuum opening.

7. An instrument casing as defined in claim 1:
a dial plate mounted above said cylindrical projections;
a pinion gear having a pin extending through said dial plate and rotatably mounted about an axis passing transversely through the point of intersection of said first and second axial lines.

8. An instrument casing as defined in claim 7:
a scale on said dial plate;
an indicator arm attached to said pinion gear and located over said dial plate;
a rack gear movable parallel to either one of said axial lines and in mesh with said pinion gear; and
means for attaching said pinion gear to a piston rod movable along one of said axial lines.

9. An instrument casing as defined in claim 8:
a pinion block attached to said dial plate and having two perpendicular edge surfaces, a space in said block at the apex of said surfaces, said pinion gear being located in said space.

10. An instrument casing as defined in claim 9 wherein each of said surfaces is parallel to one of said axial lines.

11. A combination pressure/vacuum gauge comprising:
a casing having a base;
first and second cylinders located on said base on a common axial line;
first and second pistons in said first and second cylinders, respectively;
a piston rod connected between said pistons in said cylinders;
spring means operative between said second cylinder and said second piston for biasing both said pistons toward one end of each of said cylinders;
a pressure opening in said first cylinder adjacent its said one end, and a vacuum opening in said second cylinder adjacent the end opposite its said one end; and
valve means for connecting a pressure source to said pressure opening or a vacuum source to said vacuum opening causing said pistons to move from said one end of said cylinders.

12. A gauge as defined in claim 11:
a rack gear connected to said piston rod at a location between said first and second cylinders;
a rotatably mounted pinion gear in mesh with said rack gear; and
an indicator arm secured to said pinion gear and located adjacent a dial plate having separate coextensive pressure and vacuum scales;
said indicator arm having the same available arc of scale travel for the measurement of either pressure or vacuum.

13. A gauge as defined in claim 12:
a member mounting said rack gear at one end and having an open portion at the other end for receiving said piston rod, and means for securing said open portion to said rod to maintain said rack gear in mesh with said pinion gear.

14. A gauge as defined in claim 11:
said piston rod being a square portion on one end and a round portion on the other end;
said first cylinder containing a square opening for said square shaft portion and said second cylinder containing a round opening for said round shaft portion, said square opening preventing rotation of said piston rod during axial movement.

15. A gauge as defined in claim 11:
a rolling diaphragm connected to and extending across each of said pistons and connected at the outer edge to the cylinder for each said piston, said diaphragm extending between said pistons and said cylinders in all positions of said pistons to provide a continuous seal between said pistons and cylinders.

* * * * *